United States Patent
Gauger

[11] Patent Number: 5,303,741
[45] Date of Patent: Apr. 19, 1994

[54] PLUG FOR TEMPORARILY SEALING THE END OF A PIPE

[76] Inventor: Michael Gauger, 21955 W. Broadale Dr., New Berlin, Wis. 53146

[21] Appl. No.: 821,755

[22] Filed: Jan. 14, 1992

Related U.S. Application Data

[63] Continuation-in-part of Ser. No. 559,284, Jul. 30, 1990, abandoned.

[51] Int. Cl.⁵ .............................. F16L 57/00
[52] U.S. Cl. ........................ 138/89; 137/800; 220/234
[58] Field of Search ............... 138/89, 90; 220/234, 220/46 R; 376/203; 137/800

[56] References Cited

U.S. PATENT DOCUMENTS

| | | | |
|---|---|---|---|
| 922,275 | 5/1909 | Gleason et al. | 138/89 |
| 1,837,345 | 12/1931 | Thomas | 138/89 |
| 2,763,293 | 9/1956 | Kruck | 138/89 |
| 3,039,494 | 6/1962 | Bradley | 138/89 |
| 3,065,767 | 11/1962 | Topf | 138/89 |
| 3,451,583 | 6/1969 | Lee | 138/89 |
| 3,780,773 | 12/1973 | Haugen | 138/89 |
| 3,893,487 | 7/1975 | Engelking | 138/89 |
| 4,432,394 | 2/1984 | Martin | 138/89 |
| 4,948,550 | 8/1990 | Worthy | 138/89 |

FOREIGN PATENT DOCUMENTS 993552  11/1951  France ..................... 220/46 R Primary Examiner—James E. Bryant, III
Attorney, Agent, or Firm—Andrus, Sceales, Starke & Sawall

[57] ABSTRACT

A temporary pipe plug comprised of a lightweight main body encircled by an outer sealing surface. The outer sealing surface has a rounded edge which contacts the gasket on the bell end of a sewer or water pipe. A boss is affixed to the main body which provides attachment of a chain to the plug. The chain is used for easy removal of the plug.

5 Claims, 5 Drawing Sheets

PLUG FOR TEMPORARILY SEALING THE END OF A PIPE

CROSS-REFERENCE TO RELATED APPLICATIONS

This application is a continuation-in-part of application Ser. No. 07/559,284 filed Jul. 30, 1990, now abandoned.

BACKGROUND OF THE INVENTION

This invention relates generally to pipe plugs and more specifically to temporary pipe plugs as used during the construction of sewer lines and the like.

In the course of construction of sewer or water lines, it is often desirable to plug the open end of a pipe in a temporary or semi-temporary manner. The simplest means for effecting a sort of plugging is to prop a piece of plywood of suitable size against the open end of the pipe and to hold it in place by driving a stake behind it. This method, although widely used, does not afford a good seal and allows gravel and other debris to enter the pipe.

Other more sophisticated devices are available but each has certain drawbacks when compared with the present invention. None of these are known to be available in sizes larger than 12 inches in diameter.

A plug is available in which an expandable mass of rubber is squeezed between two metal plates by means of a threaded member, the latter of which extends beyond the end of the pipe. This plug is awkward to install and with the threaded portion exposed, the plug may be dislodged or broken if the threaded member is struck by a tool during the course of construction.

Air bags have also been used to temporarily seal the ends of pipes, but they are subject to puncture and require an air line to install them.

Other Plugs, such as ductile iron plugs, may be used in a temporary manner to seal a pipe. However, these plugs are very heavy and must be pushed into place with a backhoe. They are very difficult to remove.

The present invention overcomes the problems associated with the above-mentioned plugs. The present invention provides a lightweight, durable and inexpensive temporary pipe plug. The plug of this invention may be installed and removed manually. When in place, the plug is virtually flush with the end of the pipe it seals and, therefore, not subject to damage by tools or machinery being used in its vicinity.

It is one object of the present invention to provide a temporary pipe plug that may be installed and removed manually.

Another object of the present invention is to provide a pipe seal that is not susceptible to damage from the use of tools and machinery in its vicinity.

Yet another object of the invention is to provide a temporary pipe plug that may be conveniently made in virtually any size.

In accordance with the invention, a temporary plug for placement into an open end of a pipe, includes a rigid body portion including an outer peripheral surface in close proximity to an inner peripheral surface of the pipe when the plug member is in place in the pipe. Sealing means is interposed between the outer peripheral surface of the body portion and the inner peripheral surface of the pipe for preventing debris from entering the pipe. Handle means is connected to the body portion for allowing manual removal of the plug from the pipe.

In one embodiment, the body portion comprises a multi-layer body member to which a peripheral sealing ring is mounted. In another embodiment, a peripheral groove is formed in an outer surface of the body portion, and a resilient sealing ring is positioned in the groove.

In yet another embodiment, the outer edge of the body portion is provided with a ramped or angled surface which contacts an angled sealing surface formed on an internal gasket mounted to the pipe. The angled outer surface of the body portion provides contact with the gasket along less than the entire length of the gasket sealing surface, to facilitate manual removal of the body portion. In one form, the angled outer surface extends linearly, when viewed in cross-section, between the front face and the rear face of the body portion. In another form, a pair of flat surfaces or lands are provided on the outer surface of the body portion. A first, smaller diameter land is located forwardly of the angled surface and a second, larger diameter land is located rearwardly of the angled surface. The angled surface extends between the rear of the smaller diameter land and the front of the larger diameter land.

In a further embodiment, the outer edge of the body portion is defined by a sealing ring which extends throughout the width of the body portion, between the front and rear faces of the body portion. The ring is preferably formed of a thermoplastic material. In one form, the ring defines an annular internal space, with a central lip extending inwardly into the annular space. A laminated core is secured to the ring within the annular internal space defined by the ring. The core consists of a front member and a rear member, placed one on either side of the lip and engaging the edges of the lip. One or more intermediate members may be positioned between the front member and the rear member inwardly of the lip. The front member, the rear member, and any intermediate members are secured together by any satisfactory means, such as threaded fasteners, to secure the members making up the laminated core to the sealing ring. In another form, the temporary plug may be an integral one-piece member molded of a thermoplastic material, with the sealing ring making up the outer peripheral portion of the one-piece member.

The handle means preferably comprises a flexible elongated member, such as a chain or cable, connected to the body portion. The chain or cable normally hangs downwardly to prevent interference with work being performed around the end of the pipe, and it can be grasped by the user to remove the plug member from the pipe.

The invention further contemplates a method of temporarily sealing the end of the pipe, substantially in accordance with the foregoing summary.

Other objects, features and advantages of the invention will be apparent when the description is considered in conjunction with the accompanying drawings.

BRIEF DESCRIPTION OF THE DRAWINGS

FIG. 15 illustrates engagement of the outer surfaces of a pipe plug constructed according to FIGS. 8 and 9 with the gasket of the pipe of FIG. 14.

DETAILED DESCRIPTION OF THE INVENTION

Figure 1:
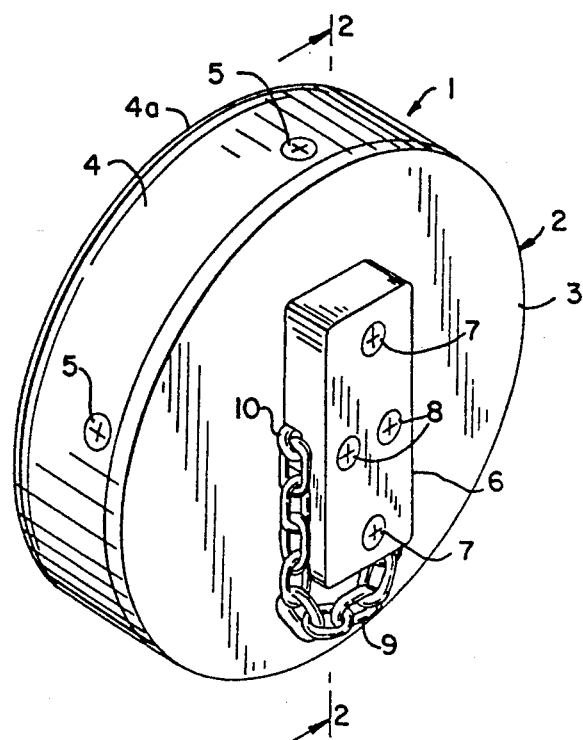
FIG. 1 is a perspective view of a pipe plug constructed according to the invention.
Figure 2:
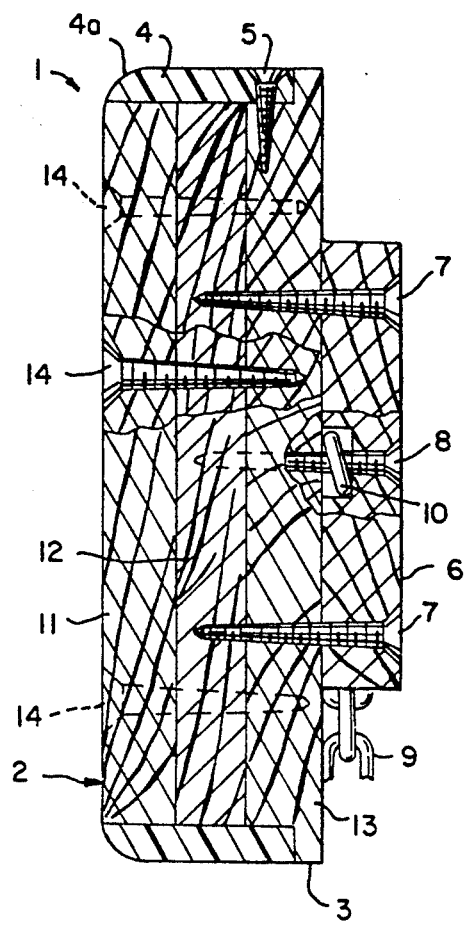
FIG. 2 is a cross-sectional view of the pipe plug of FIG. 1, taken along line 2—2 of FIG. 1.

Referring to FIGS. 1 and 2, 1 is the temporary pipe plug, 2 is the main body of the pipe plug, and 3 is a flange on the main body. The peripheral sealing surface 4 is joined to the main body 2 of the plug with screws 5. Peripheral sealing surface 4 has a rounded edge 4a. A boss 6 is affixed to the main body 2 with screws 7 and 8. Boss 6 may serve as a handle for installing or removing the plug, and it also provides attachment for chain 9. Each of screws 8 pass through a link 10 at each end of chain 9 into the main body 2 of the plug. Chain 9 is provided to assist in the removal of the plug from the pipe.

In the embodiment as shown, the main body of the plug 2 is a laminate formed by pieces 11, 12 and 13. The pieces are held together by screws 14.

It is to be appreciated that while in the embodiment shown, the main body 2 of the temporary pipe plug is constructed of three layers of plywood, the main body of the plug may be constructed of a variety of materials such as plastic, metal, a solid wood composite, or other suitable materials. Likewise, in the embodiment shown, the peripheral sealing ring 4 is shown to be made of plastic. It may be desirable to make the sealing ring 4 of wood, metal, a resilient material such as synthetic foam, or any other suitable material.

Further, if the temporary pipe plug is constructed of multiple layers of wood or other suitable material, the number of layers may vary in accordance with the diameter of the pipe to be sealed, or other parameters.

FIG. 2 shows the layers 11, 12 and 13, the boss 6, and the peripheral sealing ring 4 all assembled with wood screws. In practice, it is often desirable to assemble the plug with a combination of wood screws and adhesive. It is contemplated that in certain instances the entire assembly may be effected with the use of adhesive alone. Any assembly means known to those skilled in the art may be used without altering the spirit of the invention.

Figure 3:
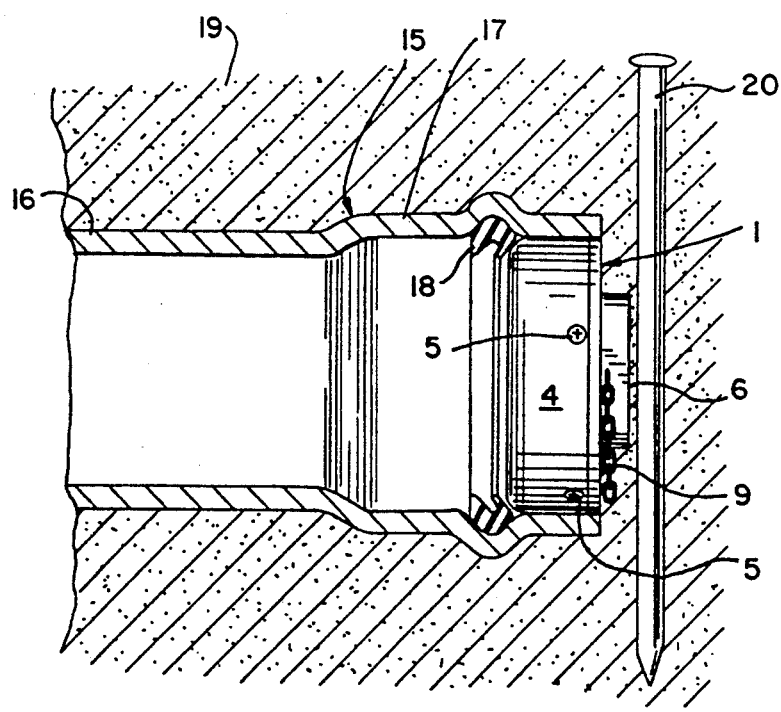
FIG. 3 is a cross-sectional view of a pipe showing the pipe plug of the invention in place.

FIG. 3 shows the temporary pipe plug installed in pipe 15. Pipe 15 is composed of a straight section 16 and an enlarged, or bell, end 17 to receive the next course of pipe to be laid. The bell end 17 has a gasket 18 for sealing the straight end 16 of the next course of pipe to be laid. In this mode of usage, the plug 1 is pushed into the bell end 17 of the pipe 15. Rounded surface 4a of plug 1 is situated close to the pipe gasket 18, but does not actually seal against it. In this position in pipe 15, the temporary plug 1 prevents debris, such as backfill 19, from entering the pipe. It can be seen in FIG. 3 that only the boss 6 of the plug extends beyond the end of the pipe, thereby reducing the likelihood of damage to the plug, or dislodgement of the plug from the pipe, while working in the vicinity of the plug. Stake 20 is used as an aid in locating the end of pipe 15. Stake 20 is not required to maintain the temporary plug in position in the pipe. Temporary plug 1 may be removed from the pipe either by pulling on chain 9 or by using boss 6 as a handle.

Figure 4:
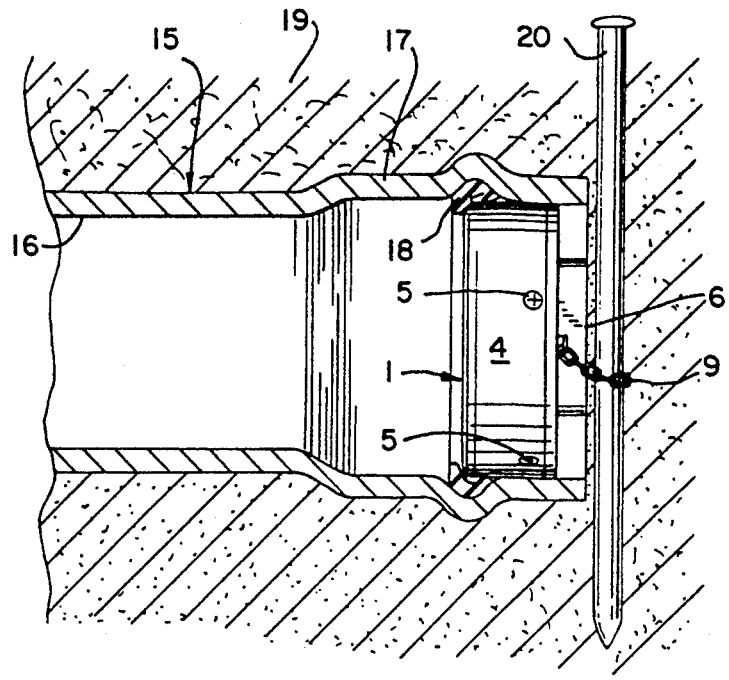
FIG. 4 is a cross-sectional view of a pipe showing the pipe plug of the invention installed in a different mode than as shown in FIG. 3.

FIG. 4 shows the plug 1 of the invention installed in pipe 15 in a position that seals the pipe against water or effluent flow. In this mode of usage, plug 1 is "bumped" into a sealing mode so that the rounded edge 4a of peripheral surface 4 is sealed against gasket 18. This seal, without completely engaging gasket 18, permits easy removal of plug 1. In this mode of installation, boss 6 is contained within the bell end 17 of pipe 15. For ease of location and removal of plug 1, stake 20 is driven through the loop of chain 9. Plug 1 could also be removed by manually pulling on chain 9.

Figure 5:
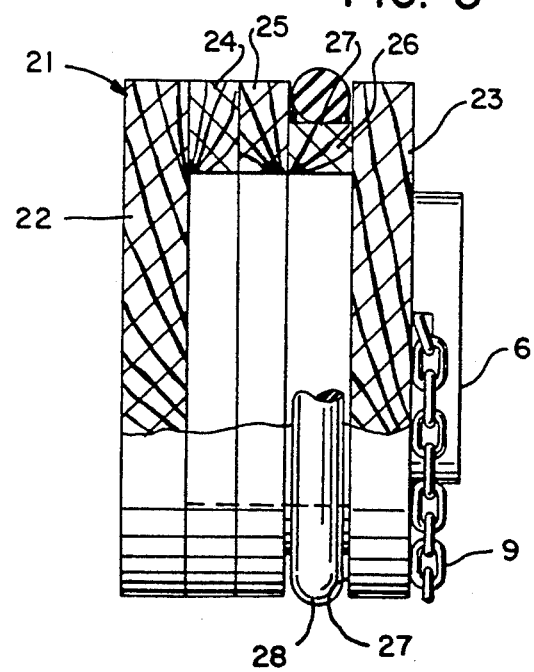
FIG. 5 is a side elevational view with parts broken away, showing another embodiment of the pipe plug of the invention.

It is sometimes desirable to temporarily seal a pipe which is not fitted with an internal gasket or sealing means. FIG. 5 shows a temporary pipe plug 21 designed for such a pipe. Plug 21 is constructed of multiple layers of plywood 22-26. Layers 22-25 are of the same diameter while layer 26 is of a reduced diameter so that, with layers 23 and 25, an "O" ring groove 27 is formed. "O" ring groove 27 receives "O" ring 28, for sealing inside a pipe. It is shown in FIG. 5 that layers 24-26 are cored in order to reduce the weight of plug 21. While hollowness of layers 24-26 may be desirable to reduce the weight of plug 21, it is not necessary for the plug to function properly. Plug 21 is also provided with boss 6 and chain 9 as in the previous embodiment.

Figure 6:
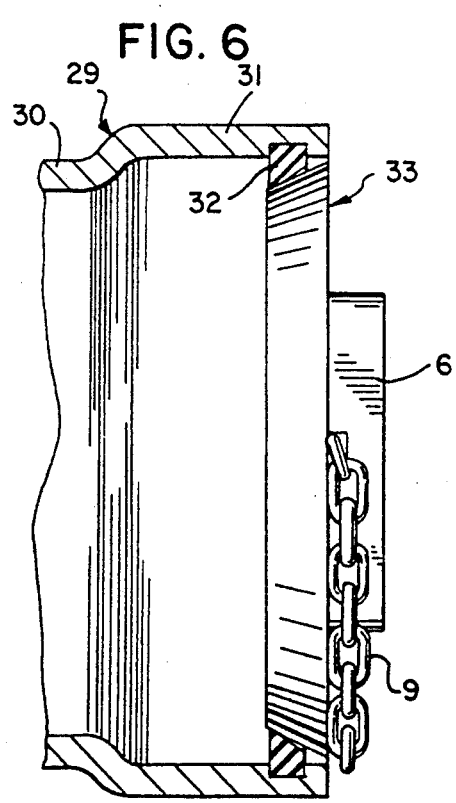
FIG. 6 is a side sectional view showing yet another embodiment of the invention.

FIG. 6 shows an end of a ductile iron pipe 29 with a straight section 30 and a bell end 31. The pipe is equipped with a tapered gasket 32 to seal straight section 30 of the next course of pipe to be laid. A third embodiment of the invention is shown, tapered plug 33. Plug 33 is also provided with boss 6 and chain 9 as in the previous embodiment.

Figure 7:
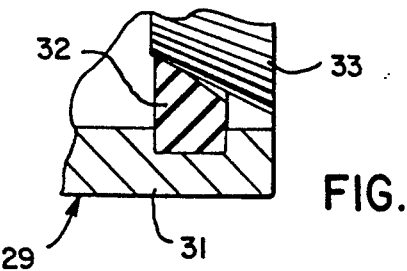
FIG. 7 is a detail view of a portion of the embodiment of the invention shown in FIG. 6.

FIG. 7 shows a detail of the seal between tapered plug 33 and pipe gasket 32. The angle of taper of the edge of plug 33 is less than the angle of taper of the gasket 32. This insures that while an effective seal will be made with the plug 33, it will not engage gasket 32 so thoroughly that removal of the temporary plug 33 is made difficult.

Figure 8:
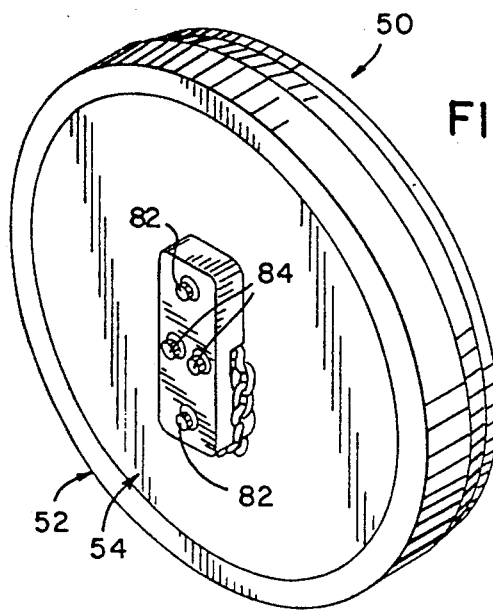
FIG. 8 is a perspective view of another embodiment of the pipe plug of the invention.

FIG. 8 illustrates an alternate form of the temporary plug, shown in 50, constructed according to the invention. Plug 50 generally consists of a circular ring 52 and a core 54.

Figure 9:
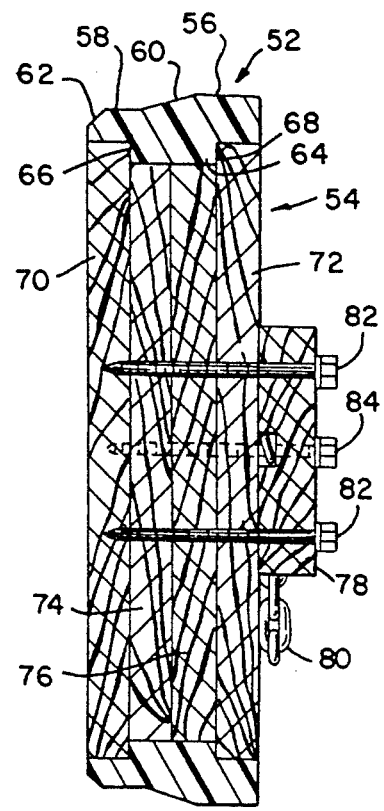
FIG. 9 is a cross-sectional view of the pipe plug of FIG. 8.

Referring to FIG. 9 the outer surface of ring 52 defines a rear flat surface or land 56, a front flat surface or land 58, and a ramped or angled surface 60 disposed between rear land 56 and front land 58. Rear land 56 defines an outside diameter larger than that of front land 58, and angled surface 60 extends between the rearward edge of front land 58 and the forward edge of rear land 56. A ramped or angled surface 62 extends between the front edge of front land 58 and the front face of ring 52.

Illustratively, for a plug 50 adapted to seal the open end of a 12" nominal diameter sewer pipe 29, rear land 56 has a diameter of 12.5", and front land 58 has a diameter of 12.3" and a front-to-rear dimension of ⅝". Angled surface 60 slopes upwardly from front land 58 at an angle of 22°, and has a front-to-rear dimension of ¾". Forward angled surface 62 slopes downwardly from front land 58 at an angle of 22° and has a front-to-rear dimension of ¼".

Ring 52 defines a circular internal space, within which core 54 is secured. Ring 52 generally defines an internal passage extending between its front and rear faces, with a lip 64 extending inwardly into the internal passage. Lip 64 defines a front shoulder 66 and a rear shoulder 68, each of which are spaced inwardly from the front and rear faces, respectively, of ring 52.

Core 54 consists of a front piece 70 cut to fit within the internal passage defined by ring 52, and placed therewithin such that the outer peripheral edge of its rear face engages front shoulder 66 defined by lip 64. Rear piece 72 of core 54 is constructed similarly to front piece 70, with the peripheral outer portion of the front face of rear piece 72 engaging rear shoulder 68 defined by lip 64. A pair of intermediate core pieces, shown at 74 and 76, are positioned between front and rear pieces 70, 72, respectively inwardly of lip 64.

A boss or block 78 is located against the rear face of rear piece 72 of core 54. Block 78 is provided with a channel, as described previously, within which the ends of a chain 80 are positioned. Top and bottom threaded screws, shown at 82, extend through block 78 and core pieces 70-76, to assemble core 54 to ring 52. As noted previously, a satisfactory adhesive could be placed between core pieces 70-76. A pair of screws 84 are located between screws 82, and extend through the ends of chain 80 to secure chain 80 to core 54. Like screws 82, screws 84 may also extend through core pieces 70-76.

Figure 10:
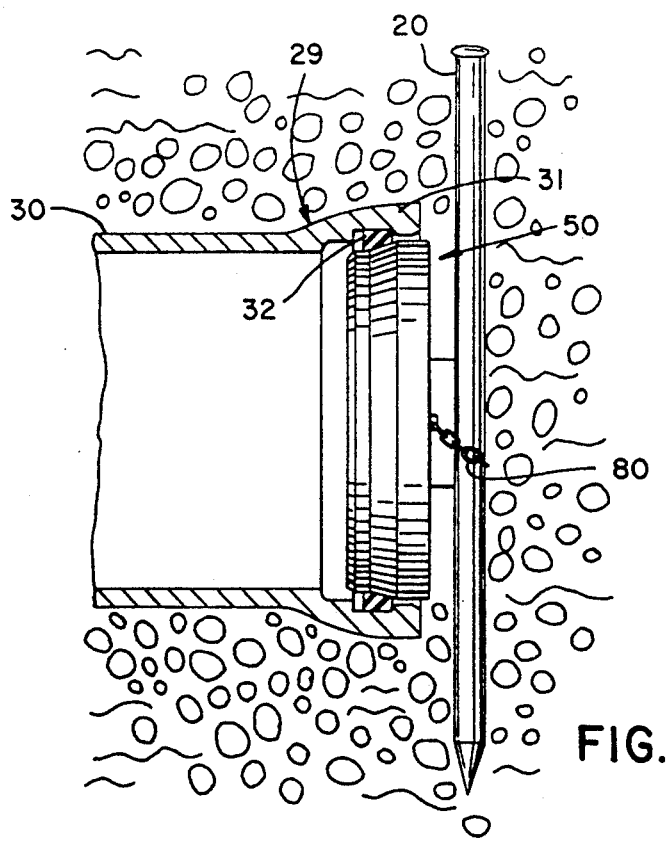
FIG. 10 is a cross-sectional view of a pipe showing the pipe plug of FIG. 8 in place.

FIG. 10 illustrates plug 50 placed within the end of a ductile iron pipe, which differs only slightly in cross section from that as shown in FIG. 6. Accordingly, like reference characters will be used for ductile iron pipe 29 to facilitate clarity. Plug 50 is inserted into the open end of pipe 29 such that angled surface 60 of ring 52 engages the inwardly facing surface of gasket 32, to provide a fluid-tight seal to the open end of pipe 29 and prevent entry of debris into pipe 29. Ring 52 is constructed such that angled surface 60 provides full peripheral contact with the inwardly facing surface of gasket 32, and such that the outer diameter of rear land 56 normally prevents plug 50 from being forced through gasket 32. With this arrangement, an operator can easily make the seal between the gasket 32 and angled surface 60 without having to worry about forcing plug 50 through gasket 32. Stake 20 is passed through chain 80 and driven into the ground below pipe 29, as described previously, to further ensure that plug 50 will not pass through gasket 32 and to assist in removal of plug 50 from the open end of pipe 29 when desired.

Figure 11:
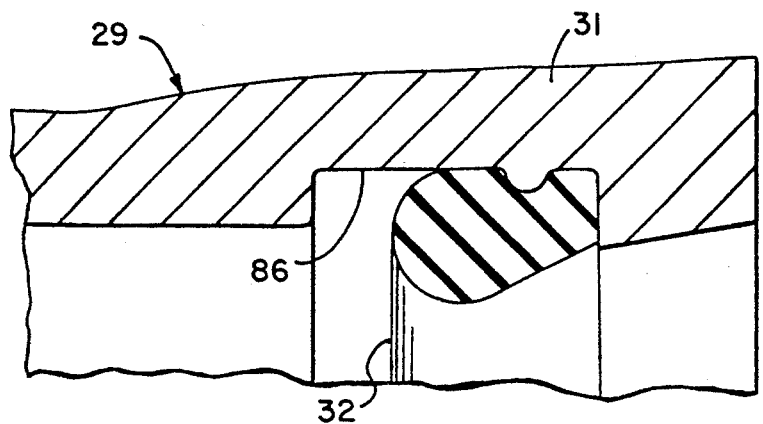
FIGS. 11-13 show a ductile iron pipe, with its associated gasket, in cross-section, and the sequence of insertion of the plug of FIGS. 8 and 9 into the open end of the pipe and engagement of the outer surfaces of the plug with the pipe gasket.
Figure 12:
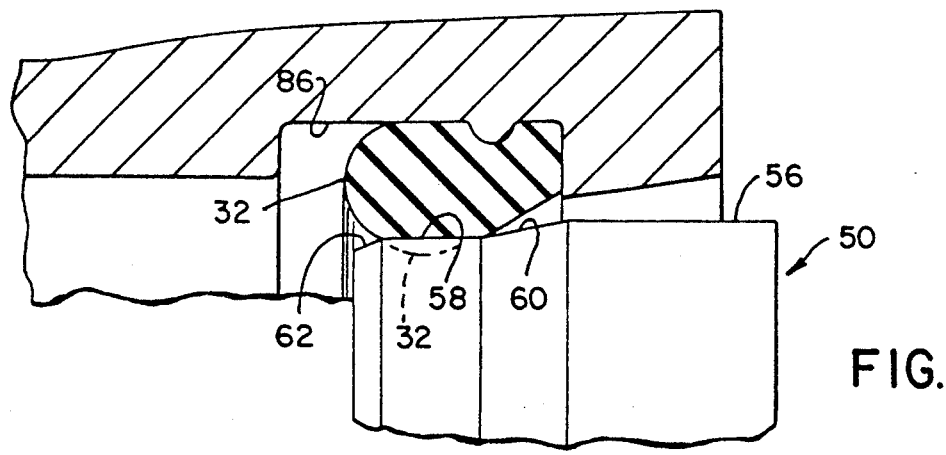
Figure 13:
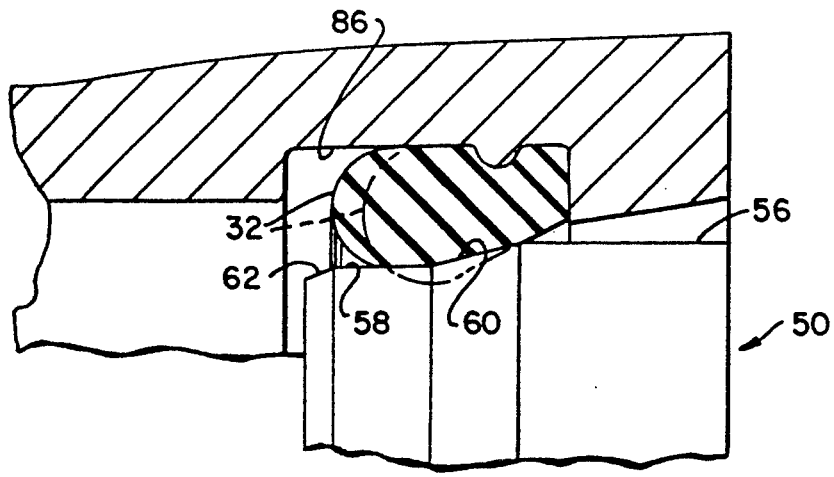

FIGS. 11-13 illustrate in greater detail the precise connection of gasket 32 within bell end 31 of pipe 29, and engagement of the outer surfaces of sealing ring 52 with gasket 32. As shown in FIG. 11, gasket 32 is positioned within an annular channel 86 formed in the inner wall of pipe 29 adjacent its open end. Gasket 32 is typically constructed of a resilient deformable material, such as rubber. Upon insertion of plug 50 into the open end of pipe 29, leading angled surface 62 of outer sealing ring 52 first engages the forward angled surface of gasket 32. Upon further insertion of plug 50, gasket 32 is engaged by front land 58 of sealing ring 52, and is sandwiched between front land 58 and the wall of channel 86, deforming gasket 32 rearwardly into channel 86. Continued further insertion of plug 50, such that the rear surface of plug 50 is flush with the end of pipe 29, results in gasket 32 riding along front land 58 until engagement of the gasket sealing surface with angled surface 60 of sealing ring 52. Gasket 32 thus deforms to conform to the contour defined by front land 58 and angled surface 60, to provide a fluid-tight seal between gasket 32 and sealing ring 52 to prevent entry of debris into pipe 29. Channel 86 formed in the inner wall of pipe 29 accommodates the rearward deformation of gasket 32 during insertion of plug 50.

When it is desired to make a more permanent seal, or a tighter temporary seal, at the end of pipe 29, the operator continues inserting plug 50 such that rear land 56 engages the inner sealing surface of gasket 32. As noted previously, rear land 56 has a diameter which normally prevents it from being forced through gasket 32. However, application of a sufficiently great insertion force will result in the inner sealing surface of gasket 32 riding along angled surface 60 until angled surface 60 is fully past gasket 32, with the inner sealing surface of gasket 32 engaging rear land 56.

The seal provided by front land 58 and angled surface 60 is normally adequate when plug 50 is temporarily installed to prevent debris from entering the open end of pipe 29. The tighter seal provided by rear land 56 is desirable when a tighter temporary seal, or a semi-permanent seal, is required for some reason.

Upon removal of plug 50, the above-described steps are substantially reversed.

Figure 14:
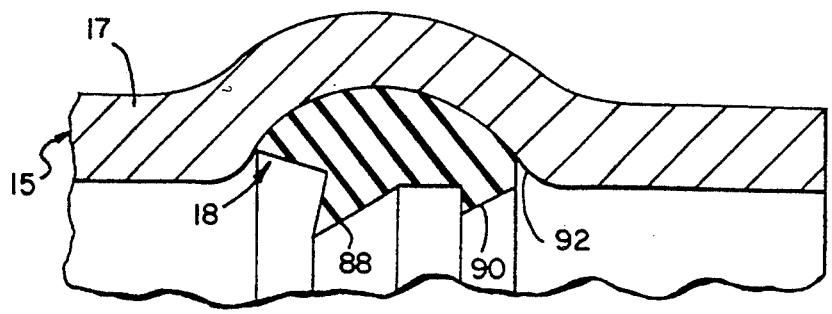
FIGS. 14 and 15 shows a PVC pipe and its associated gasket in cross-section.

FIG. 14 provides an accurate representation of the bell end 17 of a PVC pipe 15, and its associated gasket 18. Gasket 18 typically defines an inner projection 88 and an outer projection 90. Gasket 18 is positioned within a channel 92, which is arcuate in cross-section, formed in the wall of pipe end 17.

Figure 15:
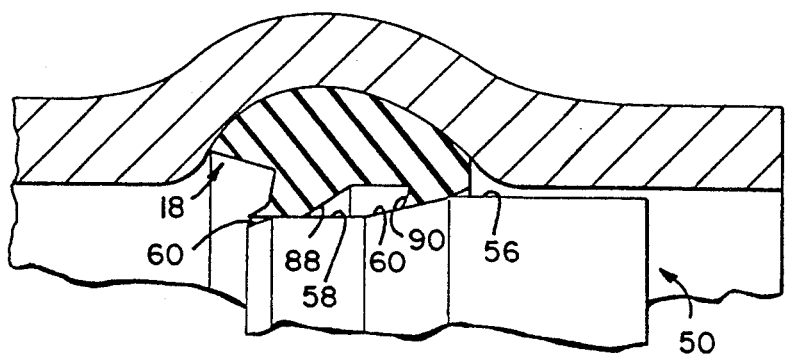

FIG. 15 illustrates plug 50 in position within bell end 17 of pipe 15, in engagement with gasket 18. Upon insertion of plug 50, angled leading surface 60 of sealing ring 52 first engages the inward leading surface of projection 90 of gasket 18, and then the inward leading surface of gasket inner projection 88. Continued insertion of plug 50 results in gasket outer projection 90 riding along front land 58 and angled surface 60, until engagement of rear land 56 with the leading surface of gasket outer projection 90. When plug 50 is in this position, gasket inner projection 88 is deformed to the position shown in FIG. 15, in which it engages front land 58. Again, rear land 56 is provided with a diameter sufficient to normally prevent it from being forced through gasket projections 88 and 90.

With the arrangement as shown and described, a fluid-tight seal is provided between front land 56 and gasket inner projection 88, as well as between angled surface 60 and gasket outer projection 90, which is adequate to prevent debris from entering into pipe 15. As described previously, stake 20 is engaged through chain 80 to prevent plug 50 from passing through gasket 18, as well as to assist in removal of plug 50 when desired.

When a tighter temporary seal, or a semi-permanent seal, is desired, a greater insertion force is exerted on plug 50 to engage the inward leading surface of gasket outer projection 90 with rear land 56.

The outer surface configuration of plug 50 allows the same plug to be used to seal the open end of either a ductile iron pipe or a PVC pipe, of equal nominal diameter.

Figure 16:
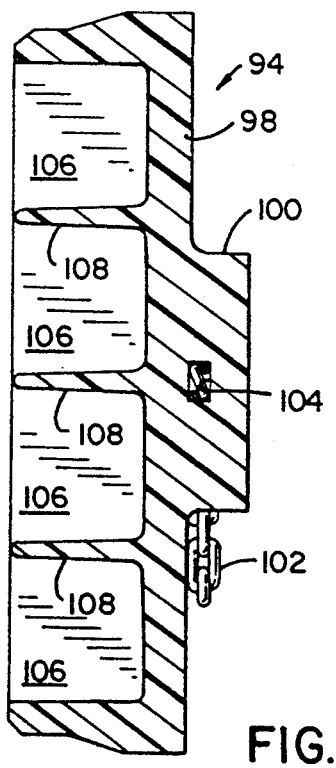
FIGS. 16 and 17 are cross-sectional views showing two different configurations for an integral, one-piece molded plug constructed according to the invention.
Figure 17:
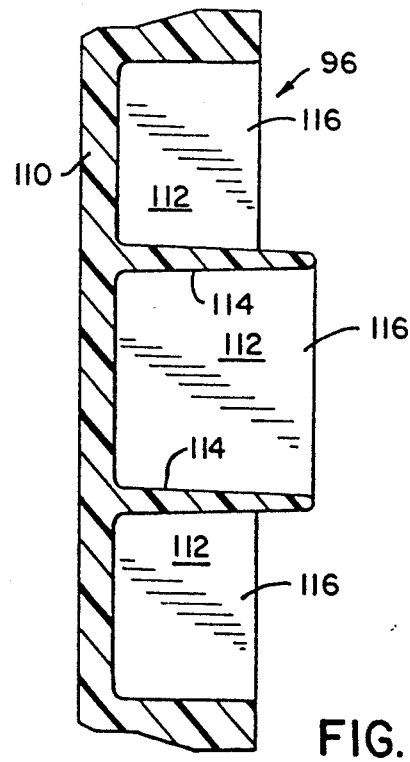

FIGS. 16 and 17 show alternate embodiments 94, 96, respectively, of one-piece integrally formed injection molded temporary plugs constructed according to the invention. Both plugs 94 and 96 define an outer sealing surface identical to that defined by sealing ring 52 of plug 50, as shown in FIG. 9, to provide sealing as shown in FIGS. 11-15. Plug 94 (FIG. 16) defines a rearwardly located wall 98 including a boss 100 to which a chain 102 is mounted in any satisfactory manner within a passage 104 formed within boss 100. A series of forwardly disposed cavities 106 are defined between a series of ribs 108, to reduce the overall weight of plug 94.

Plug 96 (FIG. 17) defines a forwardly disposed wall 110 and rearwardly facing cavities 112 defined by ribs 114 and walls 116. A satisfactory arrangement (not shown) is provided for securing a chain to the rearwardly facing portion of plug 96.

The operation and installation of plugs 94 and 96 is identical to that described previously with respect to plug 50.

While the above description contains many specificities, these should not be construed as limitations on the scope of the invention, but rather as an exemplification of some preferred embodiments thereof. Many other variations are possible, for example in materials of construction, as mentioned above, in the ratio of length to diameter of the plug, and in the means of attaching a chain or similar element to the body of the plug. Accordingly, the scope of the invention should be determined not by the embodiment illustrated, but by the appended claims and their legal equivalents.

I claim:

1. A temporary plug for the open end of a pipe, the pipe having a resilient gasket adjacent its open end, comprising a plug member adapted for placement fully into the open end of the pipe, the plug member including a solid generally cylindrical core and an outer peripheral sealing ring secured to the core and defining a sealing surface for engaging the resilient gasket to seal the open end of the pipe. the outer peripheral sealing surface including a peripheral flat front land, a peripheral flat rear land located rearwardly of the front land and having a greater transverse dimension than that of the front land, and an angled surface extending between the front land and the rear land, with the angled surface defining a narrowing transverse dimension in a direction toward the front land.

2. The temporary plug of claim 1, wherein the core comprises a plurality of layers secured together and interconnected with the sealing ring.

3. The temporary plug of claim 2, wherein the sealing ring defines a lip extending inwardly into the internal space defined by the sealing ring, with the lip defining a front shoulder and rear shoulder, and wherein the core comprises a front piece engaging the front shoulder defined by the lip and a rear piece engaging the rear shoulder defined by the lip, with the front and rear core pieces being secured together to assemble the core to the sealing ring.

4. A temporary plug for the open end of a pipe, the pipe having a resilient gasket adjacent its open end, comprising a plug member adapted for placement into the open end of the pipe, the plug member defining an outer peripheral sealing surface for engaging the resilient gasket to seal the open end of the pipe, the outer peripheral sealing surface including a peripheral flat front land, a peripheral flat rear land located rearwardly of the front land and having a greater transverse dimension than that of the front land, an angled surface extending between the front land and the rear land, with the angled surface defining a narrowing transverse dimension in a direction toward the front land, a handle arrangement for assisting in manual removal of the plug from the pipe, said handle arrangement including a boss connected to a rearwardly facing surface of the plug member, the boss being provided with a passage, a flexible elongated member connected to the plug with the ends of the flexible elongated member fixed within said passage, said flexible elongated member attached for movement between an inoperative depending position and an operative position in which the elongated member can be grasped by a user for effecting manual removal of the plug form the end of the pipe.

5. The temporary plug of claim 4, wherein the flexible elongated member comprises a chain, and wherein the chain is connected to the plug member by a pair of fasteners, with each fastener extending through an end of the chain to secure the chain to the plug member.

* * * * *